United States Patent
Mungi et al.

(10) Patent No.: US 10,943,064 B2
(45) Date of Patent: Mar. 9, 2021

(54) TABULAR DATA COMPILATION

(71) Applicant: International Business Machines Corporation, Armonk, NY (US)

(72) Inventors: Ashish Mungi, Bangalore (IN); Purushothaman K. Narayanan, Bangalore (IN); Ankur Parikh, Rajkot (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/425,223

(22) Filed: May 29, 2019

(65) Prior Publication Data

US 2019/0278838 A1 Sep. 12, 2019

Related U.S. Application Data

(63) Continuation of application No. 16/004,589, filed on Jun. 11, 2018, now Pat. No. 10,409,907, which is a
(Continued)

(51) Int. Cl.
| | |
|---|---|
| *G06F 40/18* | (2020.01) |
| *G06F 16/22* | (2019.01) |
| *G06F 16/33* | (2019.01) |
| *G06F 16/951* | (2019.01) |
| *G06F 16/332* | (2019.01) |
| *G06F 16/2457* | (2019.01) |
| *G06F 40/30* | (2020.01) |

(52) U.S. Cl.
CPC .......... *G06F 40/18* (2020.01); *G06F 16/2228* (2019.01); *G06F 16/3331* (2019.01); *G06F 16/24578* (2019.01); *G06F 16/334* (2019.01); *G06F 16/3329* (2019.01); *G06F 16/3344* (2019.01); *G06F 16/951* (2019.01); *G06F 40/30* (2020.01)

(58) Field of Classification Search
CPC ........ G06F 17/30864; G06F 17/30684; G06F 17/30654; G06F 17/3053; G06F 17/30675; G06F 17/2785; G06F 40/18; G06F 16/2228; G06F 16/3331; G06F 40/30; G06F 16/334; G06F 16/951; G06F 16/24578
See application file for complete search history.

(56) References Cited

U.S. PATENT DOCUMENTS

| | | |
|---|---|---|
| 7,792,829 B2 | 9/2010 | Brill et al. |
| 8,914,419 B2 | 12/2014 | Gerard et al. |

(Continued)

OTHER PUBLICATIONS

Byron, et al. "Error Correction in Tables Using Discovered Functional Dependencies", German Application No. 102014108191.9, filed Jun. 11, 2014. 59 pages.

(Continued)

*Primary Examiner* — Quoc A Tran
(74) *Attorney, Agent, or Firm* — Stosch Sabo (57) ABSTRACT

One or more table content documents (TCDs) can be constructed for a set of tabular data or portion thereof. A set of query features corresponding to a question can be matched to one or more TCDs. A respective candidate answer can be generated for each of the one or more TCDs having a set of features matching the set of query features above a threshold. Zero or more candidate answers can be output to a user consumable data object.

20 Claims, 7 Drawing Sheets

Related U.S. Application Data continuation of application No. 14/920,323, filed on Oct. 22, 2015, now Pat. No. 10,078,629.

(56) References Cited

U.S. PATENT DOCUMENTS

| | | | |
|---|---|---|---|
| 10,078,629 B2 | 9/2018 | Mungi et al. | |
| 2003/0097384 A1* | 5/2003 | Hu | G06F 40/20 715/234 |
| 2012/0197908 A1* | 8/2012 | Unno | G06F 40/258 707/749 |
| 2014/0244676 A1 | 8/2014 | Byron et al. | |
| 2014/0278358 A1 | 9/2014 | Byron et al. | |
| 2014/0281935 A1* | 9/2014 | Byron | G06F 40/103 715/249 |
| 2014/0379666 A1 | 12/2014 | Byron et al. | |
| 2015/0007007 A1 | 1/2015 | Byron et al. | |
| 2015/0007010 A1 | 1/2015 | Byron et al. | |
| 2015/0026178 A1 | 1/2015 | Byron et al. | |
| 2015/0026557 A1 | 1/2015 | Byron et al. | |
| 2015/0046785 A1 | 2/2015 | Byron et al. | |
| 2015/0106709 A1 | 4/2015 | Kritt et al. | |
| 2017/0116172 A1 | 4/2017 | Mungi et al. | |
| 2018/0293218 A1 | 10/2018 | Mungi et al. | |

OTHER PUBLICATIONS

Kadambi, et al., "Automatically Generating Question-Answer Pairs During Content Ingestion By a Question Answering Computing System", U.S. Appl. No. 14/565,481, filed Dec. 10, 2014.

Guggilla, et al., "Table Narration Using Narration Templates", U.S. Appl. No. 14/275,993, filed May 13, 2014.

Guggilla, et al., "Table Narration Using Narration Templates", U.S. Appl. No. 14/467,177, filed Aug. 25, 2014.

Mungi, et al., "Recursive Extraction and Narration of Nested Tables", U.S. Appl. No. 14/525,597, filed Oct. 28, 2014.

Mungi, et al., "Recursive Extraction and Narration of Nested Tables", U.S. Appl. No. 14/862,193, filed Sep. 23, 2015.

IBM, List of IBM Patents or Patent Applications Treated as Related, May 29, 2019, 2 pages.

* cited by examiner

TABULAR DATA COMPILATION

BACKGROUND

The present disclosure relates to tabular data, and more specifically, to compiling and searching tabular data.

Tabular data (i.e., data presented in a table) can be compiled by table narration. Table narration can convert the contents of a table into sentence form. In some cases, tables containing complex data, significant text, or numerous structural relationships can decrease the accuracy of table narration.

SUMMARY

Aspects of the present disclosure relate to a method comprising detecting a set of tabular data comprising one or more portions, where each portion comprises a set of information comprising at least one row header, at least one column header, and at least one cell. The method can further include creating a respective table content document (TCD) for each respective portion of the set of tabular data, where each TCD comprises a respective set of information associated with the respective portion. The method can further include generating a query comprising a set of query features based on a question and identifying a set of relevant TCDs, where each respective relevant TCD comprises a set of TCD features matching the set of query features above a first threshold. The method can further include determining one or more candidate answers based on the set of relevant TCDs. The method can further include outputting one or more candidate answers in response to the question.

Further aspects of the present disclosure relate to a system comprising a memory storing a set of tabular data and a set of non-tabular data. The system can further include an interface configured to receive a question and display an output and a processor communicatively coupled to the memory and the interface. The processor can be configured to evaluate the set of data and to identify a set of relevant tabular data. The processor can be further configured to create one or more table content documents (TCDs), where each respective TCD comprises a set of features corresponding to a portion of the set of tabular data. The processor can be further configured to determine a set of search features based on the question received via the interface, and the processor can identify zero or more TCDs having a respective set of features corresponding to the set of search features above a first threshold. The processor can determine zero or more candidate answers from the set of relevant tabular data and output the zero or more candidate answers to the interface.

Further aspects of the present disclosure relate to a computer program product comprising a computer readable storage medium having program instructions executable by a processor. The program instructions can cause the processor to retrieve a set of tabular data from the computer readable storage medium and create a set of TCDs from the set of tabular data, where each respective TCD comprises a respective set of information associated with a respective portion of the tabular data. The program instructions can further cause the processor to formulate a set of search features corresponding to a question and identify a set of relevant TCDs, where each respective relevant TCD contains a set of TCD features corresponding to the set of search features above a first threshold. The program instructions can further cause the processor to determine one or more candidate answers according to each respective relevant TCD.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to tabular data. More particularly, aspects of the present disclosure relate to compiling, searching, and extracting information from a set of tabular data. Although not limited to such applications, an understanding of some embodiments of the present disclosure may be improved given the context of evaluating tabular data.

Some embodiments of the present disclosure represent tabular data as collections of table content documents (TCDs) or as an index of a set of TCDs. In various embodiments, a discrete TCD can be generated for each row of data (or each column, or each portion of a plurality of portions). In additional embodiments, a TCD is also generated for each table. The TCD can contain information such as, but not limited to, header information, value information, context information, structural information, and metadata information.

In some embodiments, a set of TCDs or an indexed set of TCDs can be queried to answer various questions. For a given input question, a computer program can identify various keywords of the input question and query the TCDs and/or the TCD index to identify relevant aspects of the tabular data. The relevant aspects of tabular data can be extracted, scored, and ranked. One or more relevant aspects of the tabular data can be presented as an answer to the given input question.

Thus, the present disclosure provides numerous advantages. Firstly, various embodiments of the present disclosure enable accurate interpretation of data tables containing complex data, substantial amounts of text, and/or complex structural relationships. Secondly, various embodiments of the present disclosure can be used either independently or in conjunction with other question and answer (Q & A) algorithms, methods, systems, and products. Thirdly, aspects of the present disclosure can score and rank candidate answers. Fourthly, aspects of the present disclosure can be used for spreadsheets, relational tables, and other data structures in addition to traditional tabular data. Fifthly, aspects of the present disclosure do not construct row-level sentences (as is done in table narration). As a result, no new matter is introduced into a data table during the creation of syntactically correct sentences. Sixthly, aspects of the present disclosure can return cell-level contents as candidate answers. In some cases, cell-level contents can provide a more precise answer than returning the sentence associated with the row containing the cell determined to be a candidate answer (as may be done using table narration).

Thus, some exemplary advantages of the present disclosure generally relate to improved interpretation of tabular data. It is understood that the advantages described herein are exemplary advantages and not every advantage is listed. Furthermore, some embodiments of the present disclosure can exhibit all, some, or none of the advantages listed herein while remaining within the spirit and scope of the present disclosure.

For the purposes of the present disclosure, the term "header" shall refer to portions of columns or rows that contain information explaining the contents of the tabular data. In contrast, the term "cell" shall be construed to refer to a value associated with at least one header (e.g., at least a row header or at least a column header or both a row header and a column header).

Figure 1:
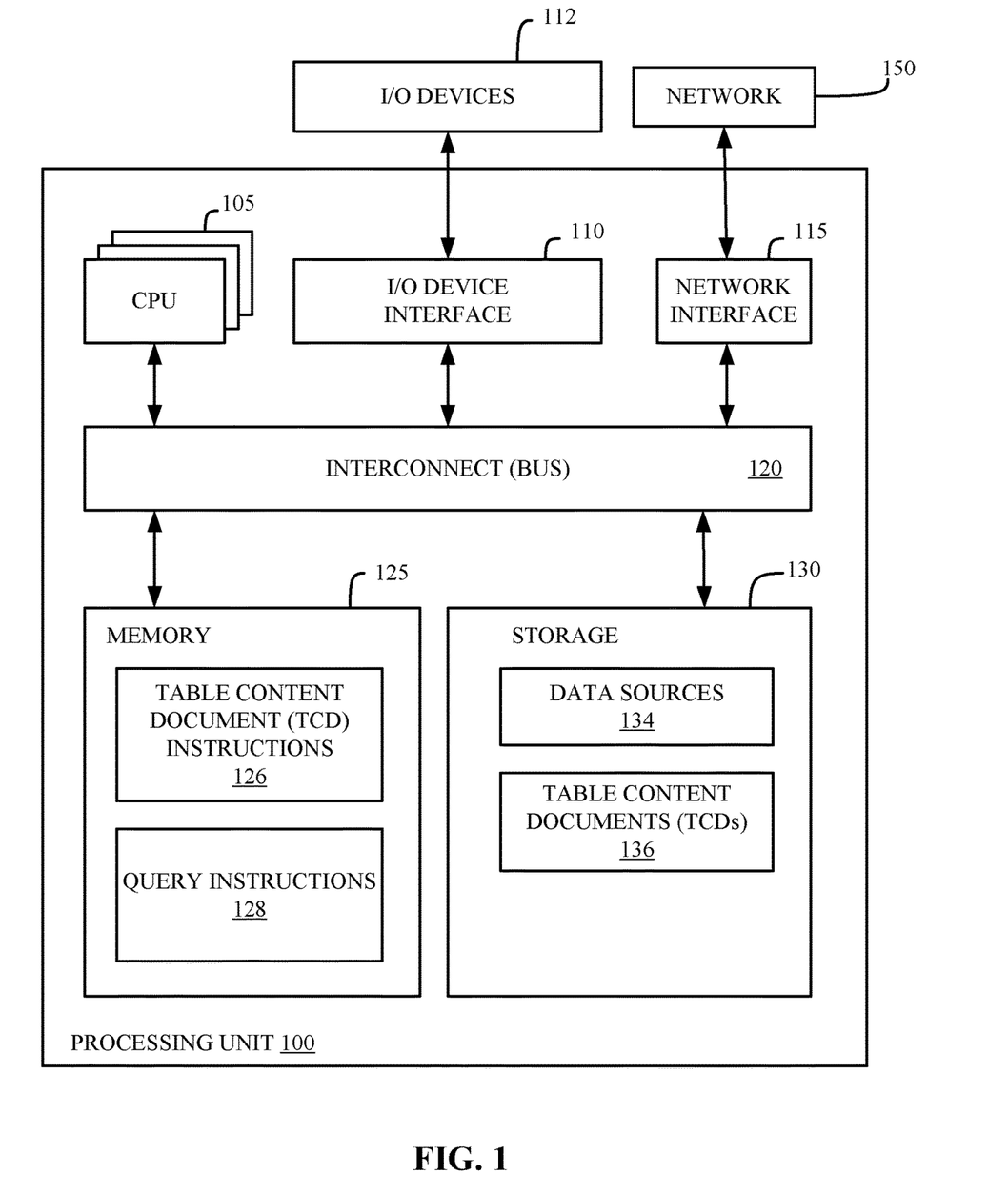
FIG. 1 illustrates a block diagram of a processing unit in accordance with some embodiments of the present disclosure.

With reference now to FIG. 1, illustrated is a block diagram of a processing unit in accordance with some embodiments of the present disclosure. In various embodiments, the processing unit 100 includes a memory 125, storage 130, an interconnect (e.g., BUS) 120, one or more processors (e.g., CPUs) 105, an I/O device interface 110, I/O devices 112, and a network interface 115.

Each processor 105 can be communicatively coupled to the memory 125 or storage 130. Each processor 105 can retrieve and execute programming instructions stored in the memory 125 or storage 130. In some embodiments, each processor 105 can execute methods as shown and described hereinafter with reference to FIG. 2 and FIGS. 4-6, or equivalents thereof. The interconnect 120 is used to move data, such as programming instructions, between the CPU 105, I/O device interface 110, storage 130, network interface 115, and memory 125. The interconnect 120 can be implemented using one or more busses. The processors 105 can be a single CPU, multiple CPUs, or a single CPU having multiple processing cores in various embodiments. In some embodiments, a processor 105 can be a digital signal processor (DSP). Memory 125 is generally included to be representative of a random access memory (e.g., static random access memory (SRAM), dynamic random access memory (DRAM), or Flash). The storage 130 is generally included to be representative of a non-volatile memory, such as a hard disk drive, solid state device (SSD), removable memory cards, optical storage, or flash memory devices. In an alternative embodiment, the storage 130 can be replaced by storage area-network (SAN) devices, the cloud, or other devices connected to the processing unit 100 via the I/O device interface 110 or a communication network 150 via the network interface 115.

The network 150 can be implemented by any number of any suitable communications media (e.g., wide area network (WAN), local area network (LAN), Internet, Intranet, etc.). In certain embodiments, the network 150 can be implemented within a cloud computing environment or using one or more cloud computing services. In some embodiments, the network interface 115 communicates with both physical and virtual networks.

The processing unit 100 and the I/O Devices 112 can be local to each other, and communicate via any appropriate local communication medium (e.g., local area network (LAN), hardwire, wireless link, Intranet, etc.) or they can be physically separated and communicate over a virtual network. In some embodiments, the I/O devices 112 can include a display unit capable of presenting information (e.g., an answer) to a user and receiving one or more inputs (e.g., a question) from a user.

In some embodiments, the memory 125 stores TCD instructions 126 and query instructions 128 while the storage 130 stores data sources 134 and TCDs 136. However, in various embodiments, the TCD instructions 126, query instructions 128, the data sources 134, and the TCDs 136 are stored partially in memory 125 and partially in storage 130, or they are stored entirely in memory 125 or entirely in storage 130, or they are accessed over a network 150 via the network interface 115.

The TCD instructions 126 and query instructions 128 can store processor executable instructions for various methods such as the methods shown and described hereinafter with respect to FIG. 2 and FIGS. 4-6 or the equivalents thereof. In some embodiments, the data sources 134 can comprise documents containing tabular data such as, but not limited to, Portable Document Format (PDF), Word, Excel, PowerPoint, Open Document Format, Lotus Symphony, or other document files. The data sources 134 can further contain web content such as, but not limited to, hypertext markup language (HTML) web content, extensible markup language (XML) web content, or other web content. The TCDs 136 can comprise both TCDs and TCD indices in various embodiments. In some cases, the TCDs are generated by one or more processors 105 evaluating one or more data sources 134 according to TCD instructions 126.

Figure 2:
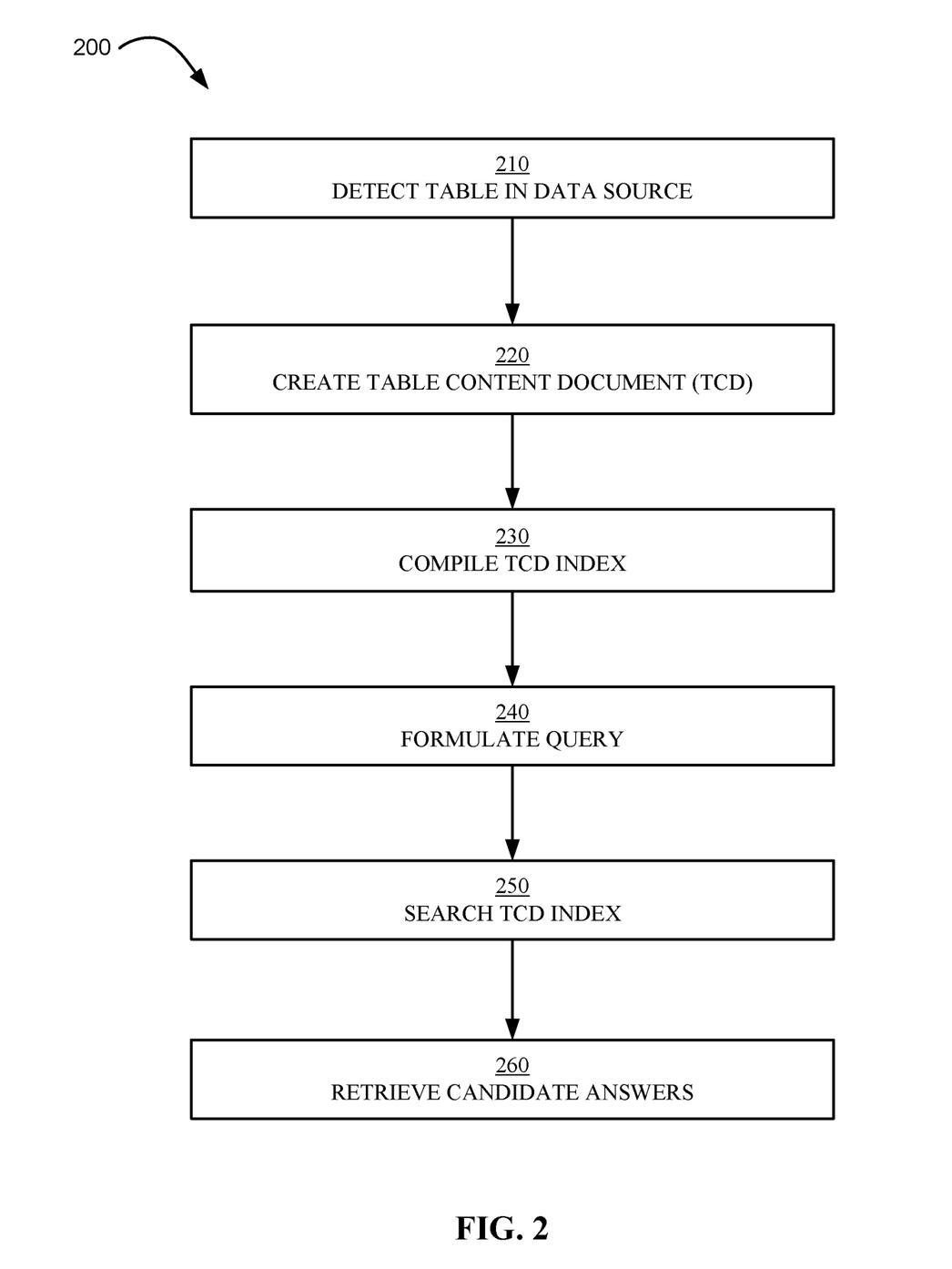
FIG. 2 illustrates a flowchart of a method for compiling and querying tabular data in accordance with some embodiments of the present disclosure.

Referring now to FIG. 2, shown is a flowchart illustrating a method for compiling and querying tabular data in accordance with some embodiments of the present disclosure. The method 200 can be implemented by one or more processors (e.g., processors 105 of FIG. 1) based on a set of instructions (e.g., TCD instructions 126 of FIG. 1).

The method 200 can begin with operation 210 in which tabular data is detected in a data source. In various embodiments the data source can comprise a document such as a PDF, Word, Excel, or other type of file (e.g., a document stored in data sources 134 of FIG. 1). In alternative embodiments, the data source can comprise a web page accessed over a network (e.g., network 150 of FIG. 1). The tabular data can be detected by any one, or any combination of, known methods in the art for identifying a set of tabular data embodied in a document or on a web page.

In operation 220, a TCD is made based on the contents of the tabular data detected in operation 210. An example TCD will be described in further detail hereinafter with respect to FIG. 3A, FIG. 3B, and FIG. 4. In operation 230, a TCD index can be created, or the contents of the TCD compiled in operation 220 can be added to an existing TCD index. An example TCD index is described in further detail hereinafter with respect to operation 470 of FIG. 4.

Operation 240 can comprise receiving a question and formulating a query based on the question. The formulated query can comprise a set of features that are searchable within, and matchable to, aspects of a TCD or a TCD index. Operation 240 will be described in greater detail hereinafter with respect to operation 520 of FIG. 5.

In operation 250, the method 200 can search the TCD created in operation 220 or the TCD index created in operation 230 via the formulated query to identify candidate answers to the received question. Candidate answers can comprise a row of relevant information, a cell of relevant information, or a combination of header value(s), cell value(s), and other information contained in the TCD that may be useful as a component of a candidate answer. In some embodiments, the candidate answers are scored and ranked in operation 250. Additional aspects of operation 250 are described in further detail hereinafter with respect to FIG. 6.

Operation 260 comprises retrieving candidate answers based on the search of operation 250. In some embodiments, operation 260 further comprises outputting one or more candidate answers to a display (e.g., I/O device 112 of FIG. 1).

Figure 3A:
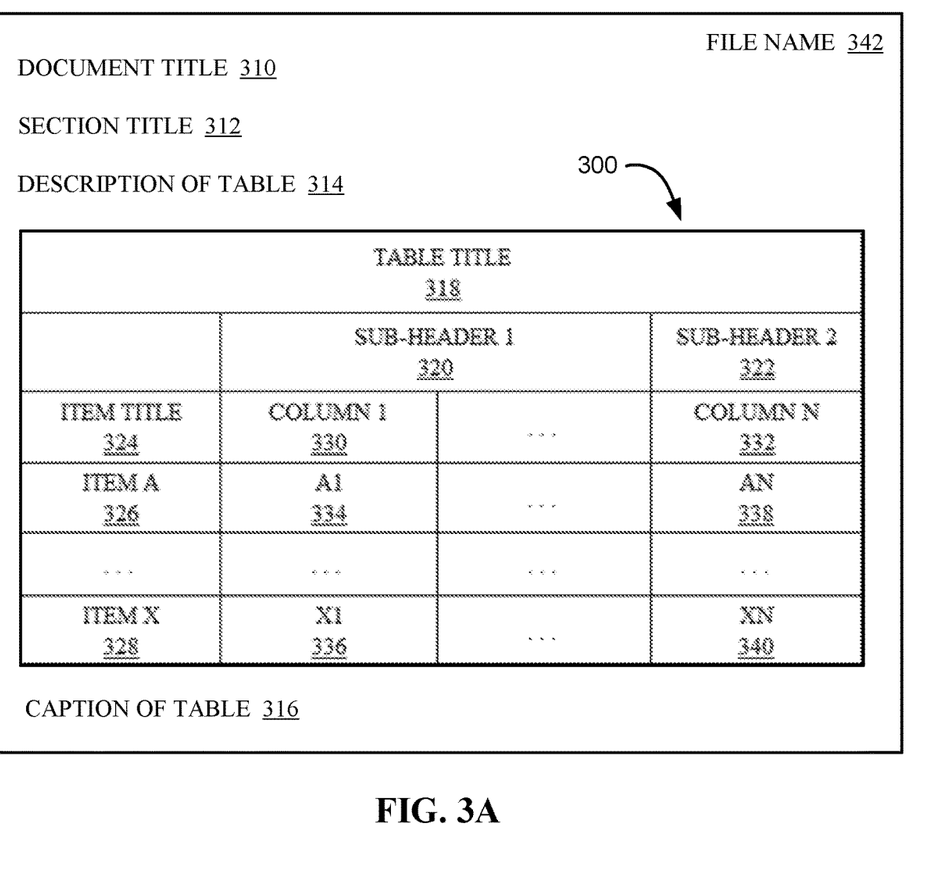
FIG. 3A illustrates a set of tabular data in accordance with some embodiments of the present disclosure.

Referring now to FIG. 3A, shown is an example set of tabular data in accordance with some embodiments of the present disclosure. The set of tabular data can contain a table 300 having a table title 318 and one or more column titles such as sub-headers (e.g., sub-header 1 320 and sub-header 2 322) and column titles (e.g., column 1 330 through column N 332). Sub-header 1 320 and sub-header 2 322 are optional, and, thus, no sub-headers can be present or numerous sub-headers can be present. The tabular data can contain one or more row headers (e.g., item title 324) referring to one or more subjects (e.g., item A 326 through item X 328). Although only one row header is present, numerous row headers are possible (e.g., one or more row sub-headers), or it is also possible that there may be no row headers.

The table 300 can be populated by values corresponding to the various combinations of column headers and row headers such as A1 334 through AN 338, and X1 336 through XN 340. In the present disclosure, both "N" and "X" refer to variables that can comprise any number equal to or greater than zero. Thus, a table can have a single value corresponding to a single row header and a single column header, or a table can have a plurality of values associated with a plurality of row headers and/or a plurality of a column headers.

In addition to data contained within the table 300, TCDs can also utilize non-tabular data from surrounding text and/or metadata associated with the table 300. For example, information such as the document title 310, section title 312, descriptions of the table 314 (e.g., in the surrounding paragraphs), a caption of the table 316, and the file name 342 can be used to gather additional information about the table 300. It is understood that the aforementioned examples of non-tabular data relating to the table 300 are exemplary and should not be construed as limiting.

Figure 3B:
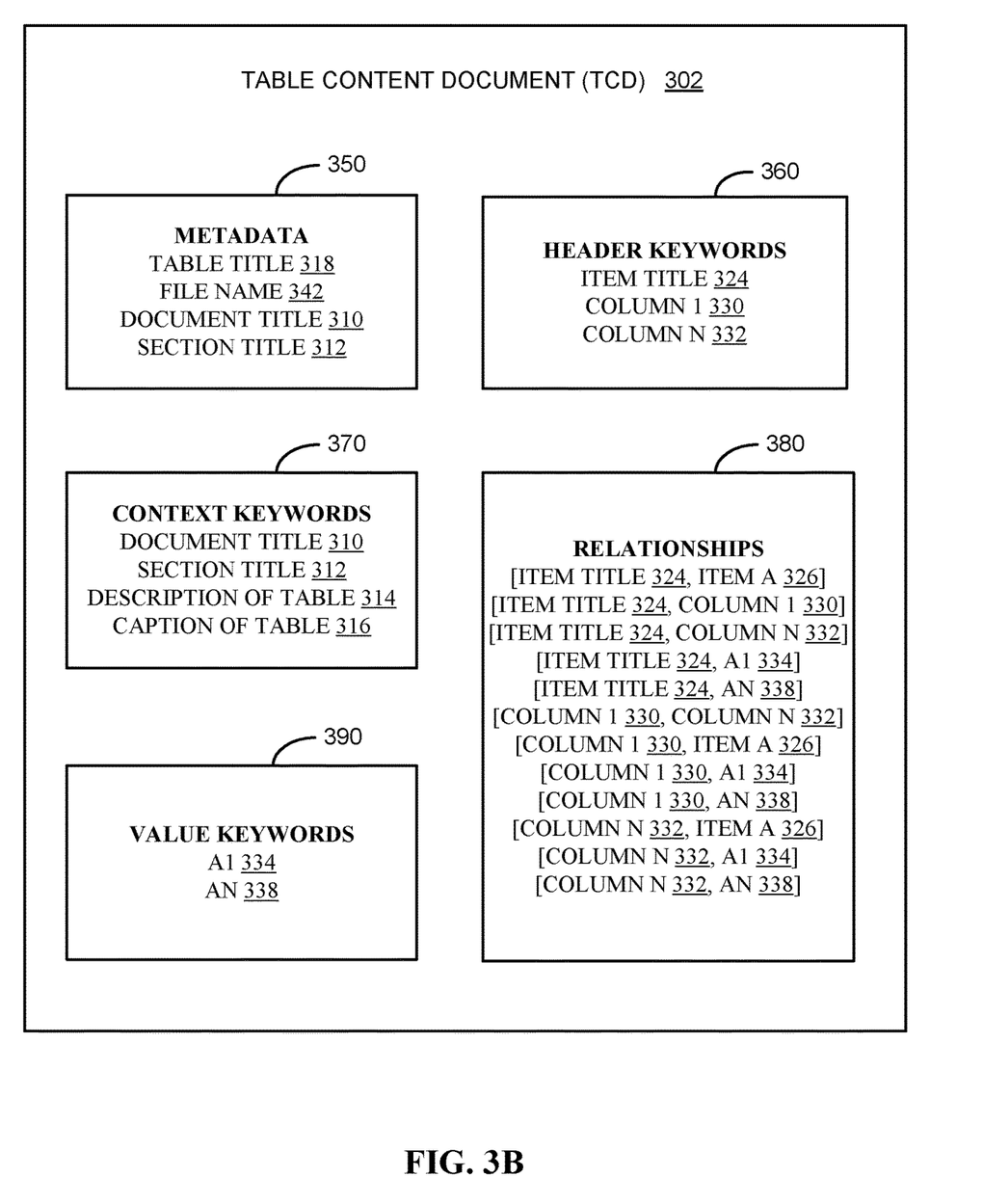
FIG. 3B illustrates a table content document (TCD) using the information presented with respect to FIG. 3A according to some embodiments of the present disclosure.

Referring now to FIG. 3B, shown is an exemplary TCD corresponding to a portion of the table 300 of FIG. 3A. The TCD 302 is constructed according to the row of information associated with item A 326 of the table 300. For the purposes of simplicity, the TCD 302 does not account for the optional column headers sub-header 1 320 and sub-header 2 322. The TCD 302 can contain metadata 350, header keywords 360, context keywords 370, relationship information 380, and value keywords 390.

The metadata 350 can contain information such as, but not limited to, the table title 318, the file name 342, the document title 310, and the section title 312. In various embodiments, the metadata 350 can contain the aforementioned information in its entirety or a portion of the aforementioned information. Thus, as used herein, metadata includes data used to trace the table back to the original source document. In some embodiments, each table can also be assigned a Table ID and Sequence number, which are used to determine the original table structure across a collection of TCDs. In such embodiments, the metadata can include the Table ID and Sequence number. The header keywords 360 can contain information such as, but not limited to, the item title 324, column 1 330, and column N 332.

The context keywords 370 can contain information derived from non-tabular data such as, but not limited to, the document title 310, the section title 312, the description of the table 314, and the caption associated with the table 316. In some embodiments, the context keywords 370 are weighted according to the importance of the context keyword 370. The importance of the context keyword 370 can be determined by the number of times the word appears, the word being associated with a list of words having a predetermined weighting, a similarity exhibited between the context keywords and the tabular data, or other techniques or combinations of techniques useful to determining and associating a measure of relevance between the context keywords 370 and the data contained in table 300.

The relationship data 380 can include structural relationships between the various components associated with item A 326 and its related values and headers. Thus, for the row of information relating to item A 326, the TCD relationships 380 can include: item title 324, item A 326; item title 324, column 1 330; item title 324, column N 332; item title 324, A1 334; item title 324, AN 338; column 1 330, column N 332; column 1 330, A1 334; column 1 330, AN 338; column 1 330, item A 326; column N 332, item A 326; column N 332, A1 334; and column N 332, AN 338. In various embodiments, fewer relationships or more relationships than the relationships previously listed are used. In further embodiments, the various relationships can be weighted according to relevance or other factors.

Thus, as shown in FIG. 3B, the TCD 302 can extract numerous information from a set of tabular data and the surrounding information. The TCD 302 can compile a set of metadata 350, a set of header keywords 360, a set of context keywords 370, a set of relationships 380, and a set of value keywords 390. The TCD presented in FIG. 3B is for the row containing item A 326, and, thus, to fully compile the information contained in data table 300, a respective TCD can be created for each row of the data table 300 (i.e., rows containing item A 326 through item X 328). Although FIG. 3B illustrates a TCD for a row of data, alternative embodiments can organize TCDs by column of tabular data or by other portions of tabular data.

Figure 4:
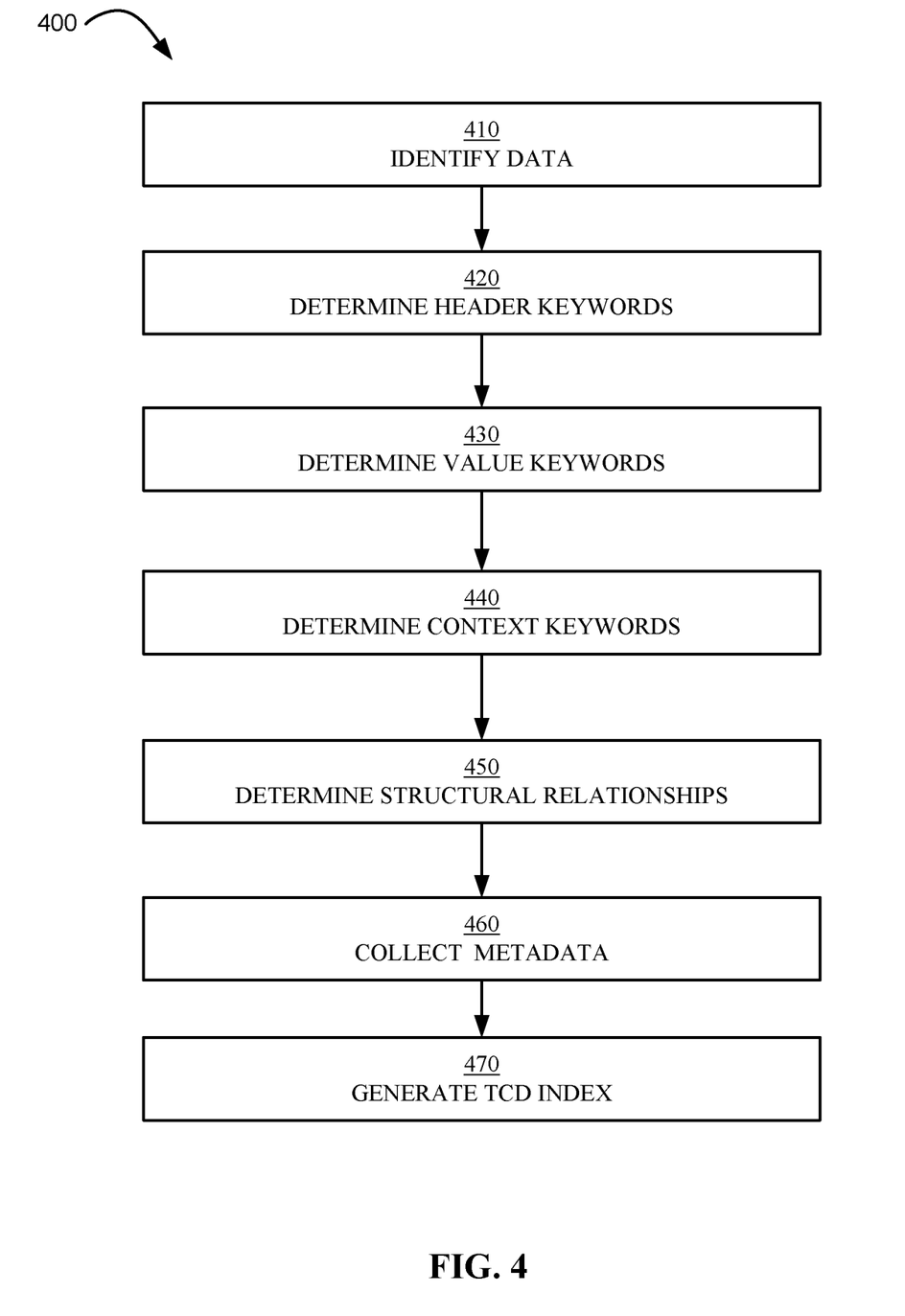
FIG. 4 illustrates a flowchart for a method to create a TCD in accordance with some embodiments of the present disclosure.

Referring now to FIG. 4, illustrated is a flowchart for a method to create a TCD in accordance with some embodiments of the present disclosure. The method 400 can be implemented by one or more processors (e.g., processors 105 of FIG. 1) executing a set of instructions (e.g., TCD instructions 126 of FIG. 1). The method 400 can begin with operation 410 by identifying the tabular data to be compiled. The data can be the same or substantially the same as the data sources 134 of FIG. 1 (e.g., documents), or the data can be accessed over a network (e.g., network 150 of FIG. 1). In various embodiments, the data can comprise documents or web pages having tabular data embodied therewith. Regardless of the source of the tabular data, operation 410 will select a row, or other portion of the tabular data, from which to generate a TCD. In some embodiments, a TCD can also be created for the table as a whole, and, subsequently, a plurality of TCDs can be created for each selected portion of the table.

Operation 420 can determine header keywords based on the tabular data identified in operation 410. Header keywords can include, but are not limited to, column headers, column sub-headers, row headers and row sub-headers. In some embodiments, the header keywords 360 of FIG. 3B can be an example output of operation 420.

Operation 430 can determine value keywords. In various embodiments, the value keywords are the contents of the individual cells that can be associated with one or more column headers and one or more row headers. In some embodiments, the value keywords 390 of FIG. 3B can be an example output of operation 430.

Operation 440 can determine context keywords. In various embodiments, context keywords can include, but are not limited to, titles (e.g., document titles, chapter titles, section titles, table titles, etc.), sentence or paragraph descriptions associated with the tabular data, captions associated with the tabular data, and other aspects of the document that can provide contextual information regarding the tabular data. In some embodiments, the context keywords 370 of FIG. 3B can be an example output of operation 440.

Operation 450 can determine structural relationships between aspects of the tabular data. Structural relationships can comprise relationships between headers and other headers, and between headers and values. The relationships between headers and values can comprise relationships between a header and its associated value, and also between a header and unassociated values. Unassociated values can refer to values that are not under the given header. For example, given column headers titled "animal" and "cost" and values "dog" (under "animal" header) and "$150" (under "cost" header), then the relationship between headers and associated values can be "animal-dog" and "cost-$150", whereas the relationship between headers and unassociated values can be "animal-$150" and "cost-dog." In some embodiments, the relationship data 380 of FIG. 3B can be an example output of the operation 450.

Operation 460 can collect metadata from the document. Metadata can include, but is not limited to, table identification information, file name information, document title information, section title information, and other metadata that may be relevant to creating a TCD, indexing a TCD, and/or searching a TCD or index thereof. In some embodiments, the metadata 350 of FIG. 3B can be an example output of the operation 460.

Operation 470 can generate a TCD-index based on the TCD. In some embodiments, the TCD-index is based on the TCD generated in operations 410-460 while in alternative embodiments the TCD-index is pre-existing and the data generated in operations 410-460 is added to the pre-existing TCD-index. In various embodiments, the TCD-index comprises a data object containing the information stored in a plurality of TCDs. The TCD-index can be organized in numerous manners beneficial to locating relevant information based on characteristics of the indexing mechanism used. In some embodiments, the TCD-index stores information more efficiently than individual TCDs, and/or the TCD-index can store a portion of the information stored in the TCDs based on various characteristics of the indexing mechanism used. In various embodiments, operation 470 can use an indexing mechanism such as, but not limited to, Apache Lucene, Apache Solr, or Indri, which are known to one of skill in the art. It is to be understood that advances in methods, programs, or products useful to indexing a plurality of sets of data (e.g., a plurality of TCDs) fall within the spirit and scope of the present disclosure.

Figure 5:
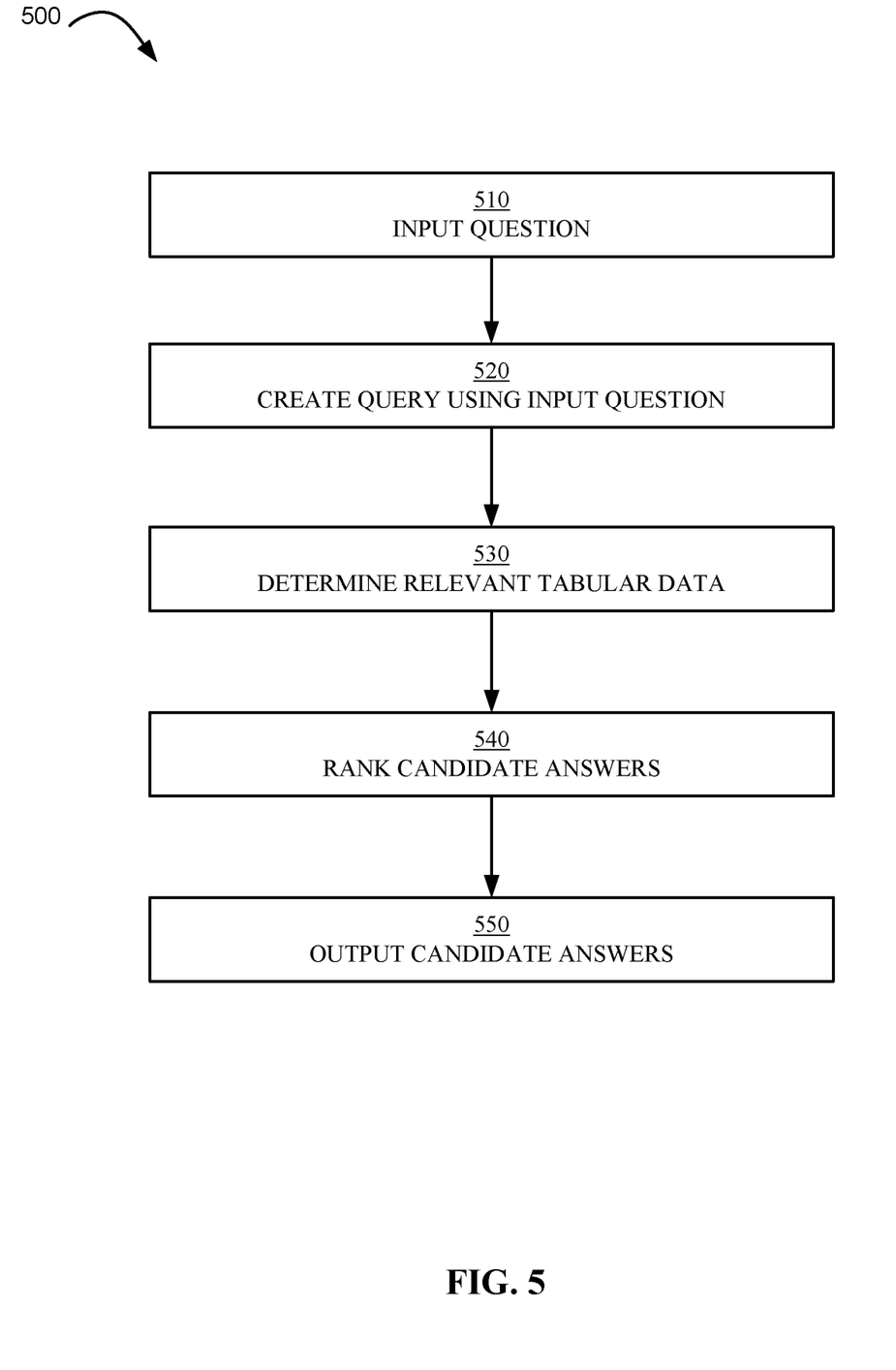
FIG. 5 illustrates a flowchart for a method of answering a question using one or more TCDs in accordance with some embodiments of the present disclosure.

Referring now to FIG. 5, illustrated is a flowchart for a method of answering a question using one or more TCDs in accordance with some embodiments of the present disclosure. The method 500 can be executed by one or more processors (e.g., processors 105 of FIG. 1) according to a set of instructions (e.g., query instructions 128 of FIG. 1).

The method 500 can begin by inputting a question in operation 510. In some embodiments, operation 510 includes classifying the question as "tabular" or "non-tabular," which can be based on the syntactic form of the question. For example, tabular data can be beneficial to answer questions having a syntactic form of "if 'x' is 'y,' what is 'z'?" In the example question, "x" and "z" can each refer to headers and "y" can refer to a cell value at the intersection of column "x" and row "z," for example. The example syntactic form should not be construed as limiting, rather, a variety of syntactic forms based on a variety of features can be classified as particularly conducive to answers derived from tabular data. Thus, in some embodiments, operation 510 may proceed to operation 520 in the event the input question is in a tabular syntactic form. Or, in alternative embodiments, the syntactic form of the question, or the classification thereof, can be stored for later use in operation 530 and/or operation 540. In alternative embodiments still, the syntactic form of the question is not considered.

In operation 520, a query can be created based on the input question. The query can use features of the question that can be beneficial for identifying similarities between the question and a TCD or index thereof. In various embodiments, the query features can include keywords, phrases, n-grams, sequences, part-of-speech (POS) tags, or other information beneficial to decomposing a question into a set of constituent parts searchable in a TCD or index thereof. In addition to the aforementioned features, additional qualifiers to said features can be used, such as the source of, or relative location of, selected keywords, phrases, n-grams, sequences, or POS tags. In some embodiments the source of the aforementioned features can refer to a specific portion of a TCD (e.g., metadata, header keywords, context keywords, etc.).

As is understood by one skilled in the art, POS tags can include, but are not limited to adjectives, adverbs, conjunctions, articles, nouns, numerals, particles, pronouns, verbs, punctuations, and other tags. A sequence can be an ordered set of terms. Terms can comprise letters, spaces, words, punctuations, POS tags, or other linguistic characteristics. N-grams can be a sequence of n terms. A keyword can be a sequence of letters comprising a word, or portion thereof, appearing in a TCD or index thereof. A phrase can be a sequence of keywords, or portions thereof, having a discrete meaning unto itself which can appear in a TCD or index thereof. Thus, according to various embodiments of the present disclosure, keywords, phrases, n-grams, sequences, POS tags, and other characteristics can be used to define a set of query features.

In further embodiments, field boosting and/or query boosting strategies can be employed as part of the query. As understood by one skilled in the art, field boosting and/or query boosting can refer to increasing or decreasing the relative weighting of selected search terms. Thus, query boosting and/or field boosting can assist in identifying preferred answers. For example, a query can include a sequence X and a POS A. In some embodiments, a user or product can apply a boosting search to each term, such that TCDs having a sequence X can have a weighted score of 1.5, while a TCD having POS A can have a weighted score of 0.1. As a result, TCDs having a sequence X can have a disproportionately higher score than TCDs having a POS A. Thus, the importance of various search terms can be moderated by using query boosting or field boosting in accordance with some embodiments of the present disclosure.

Operation 530 can identify relevant tabular data according to the query of operation 520. The relevant tabular data can comprise identifying relevant TCDs in an index of TCDs. In some embodiments, the relevant tabular data can be first identified by searching an index of table-TCDs (i.e. TCDs corresponding to entire tables) and subsequently searching an index of row-TCDs (i.e. TCDs corresponding to a specific row of a table). In alternative embodiments, the index of row-TCDs can be searched. In alternative embodiments still, one or more TCDs can be searched directly without consulting an indexed compilation of TCDs.

Thus, operation 530 can identify relevant portions of data according to the TCD or TCD index. In some embodiments, TCD features are compared to query features. In cases where the TCD features match the query features above a first threshold, the TCD can be considered a relevant TCD. It is to be understood that, as used herein, the term "match" does not require an identical correspondence between the items being compared, but can include items which vary from one another within a predefined tolerance level. Thus, matching items can be identical items or items that are sufficiently similar to each other.

In some embodiments, operation 530 scores each candidate answer. The scoring of each candidate answer can be associated with the number of matched features, the type of matched features, both, or other considerations. In some embodiments, the scoring can further include information regarding the syntactical structure of the question. Thus, for input questions having a syntactic structure beneficial to an answer derived from a tabular format (e.g., as described with respect to operation 510), the score can be weighted to account for increased confidence in a tabular answer to a question having said structural characteristics. Such a scoring technique can be beneficial in cases where the method 500 occurs in tandem with other question and answer (Q&A) engines (e.g., natural language processing). Operation 530 will be described in greater detail hereinafter with reference to FIG. 6.

Operation 540 ranks the results output by operation 530. Operation 540 can rank the results based on scores associated with each candidate answer. In operation 550, one or more candidate answers can be output to a user. The output can comprise a single output or numerous outputs. In various embodiments, each output can be associated with a score or a confidence rating which can, in some embodiments, indicate the estimated probability of the correctness of the answer.

Figure 6:
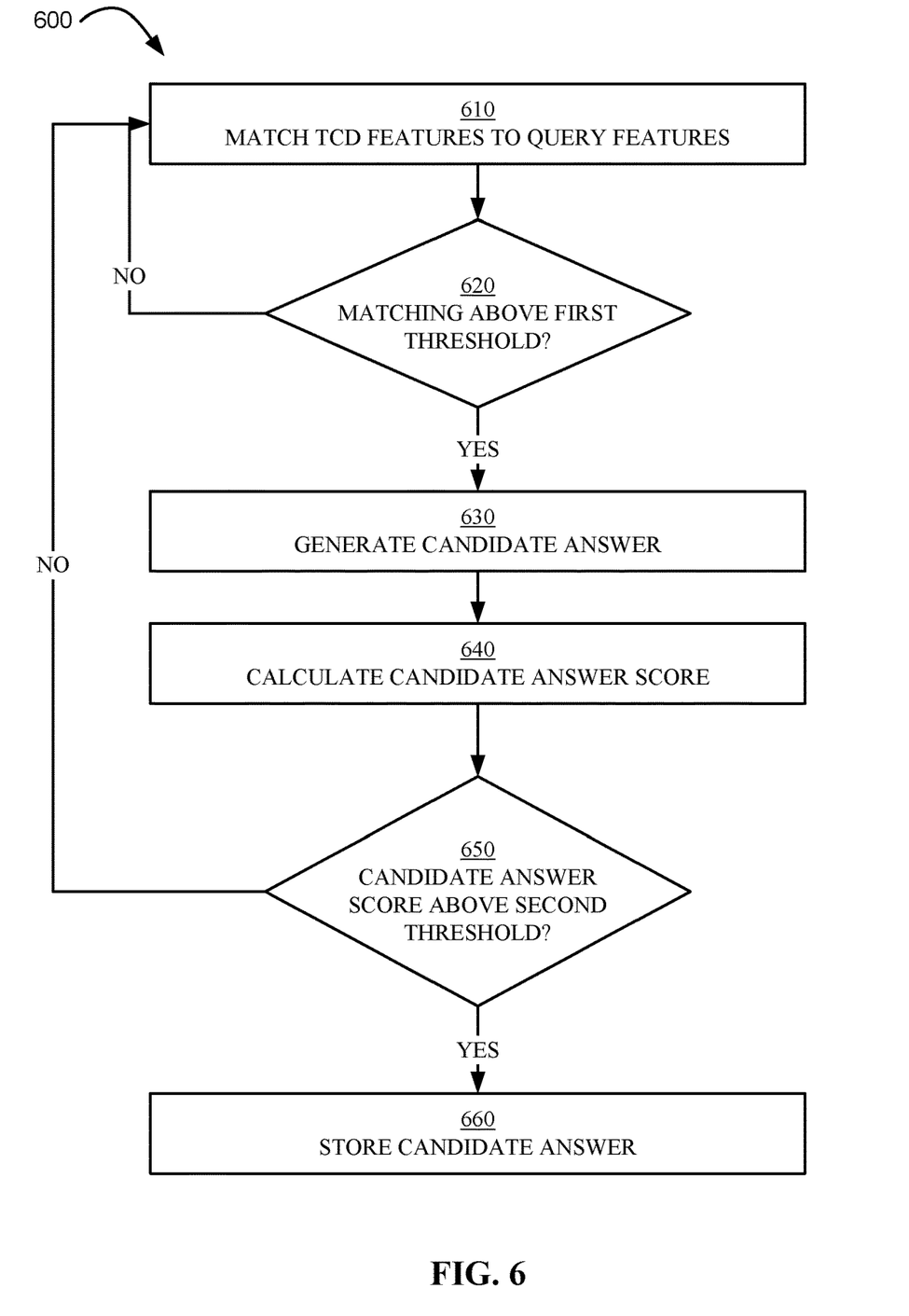
FIG. 6 illustrates a flowchart for a method of scoring candidate answers in accordance with some embodiments of the present disclosure.

Referring now to FIG. 6, illustrated is a method for determining relevant data in response to a query in accordance with some embodiments of the present disclosure. The method 600 can be implemented by one or more processors (e.g., processors 105 of FIG. 1) executing a set of instructions (e.g., query instructions 128 of FIG. 1).

The method 600 can begin with operation 610 in which TCD features are matched to query features. The matching can occur by comparing a query to a TCD or to a TCD index. Operation 620 determines if the matching is above a first threshold. In various embodiments, the operation 620 can be based on any one, or any combination of, the number of matches, the type of matches, and/or the closeness of matches. The term "matches," as used in this context, refers to features that are shared between the TCD and the query, or, in some cases, features that are similar between the TCD and the query. In some embodiments, the threshold comprises a number or a percentage of the closest matched TCDs.

In cases where the matching does not exceed the first threshold, the method 600 can return to operation 610 and continue searching TCDs or the TCD index for matching features to the query TCDs. In cases where the matching does exceed the first threshold, the method 600 can continue to operation 630. In operation 630, a candidate answer can be generated from the row identified in operation 610 and determined relevant in operation 620. The candidate answer can include any one or any combination of the information stored in the TCD (e.g., header keywords, value keywords, context keywords, metadata, and/or relationship data). In some embodiments, operation 630 selects the most relevant cell value of each respective TCD as the candidate answer for said TCD.

Operation 640 calculates a respective candidate answer score for each candidate answer. The candidate answer score can be based on the number and/or type of matched query features to TCD features, the syntactic structure of the question, and/or other aspects of the TCD associated with the candidate answer and relevant to the input question. In some embodiments, decision tree machine learning algorithms are associated with various aspects of operations 610, 620, 630, and/or 640. Thus, the answers and scores generated in the method 600 can be further informed by historical data and predictive analysis associated with decision tree machine learning. As is understood by one skilled in the art, decision tree machine learning can cause a program, product, or machine to map a question to an answer. In an example, an input question can be decomposed into constituent parts (e.g., nodes). A plurality of tabular data (e.g., leaves) can be associated (e.g., by branches) with each constituent part. Interrelationships between the constituent parts and the associated data (e.g., branches connecting leaves) can be evaluated and used to determine a candidate answer and/or a score thereof.

Operation 650 compares each candidate answer score to a second threshold. In various embodiments, the second threshold can comprise a number against which each candidate answer is compared, or the second threshold can comprise a limited number or percentage of the best candidate answers that can proceed to operation 660. In cases where the candidate answer score is not above the second threshold, the method 600 can return to operation 610 and continue searching for relevant TCDs. In cases where the candidate answer score is above the second threshold, the candidate answer can be stored in operation 660. In various embodiments the candidate answer can be stored in a memory or storage (e.g., memory 125 or storage 130 of FIG. 1).

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   detecting a set of tabular data having a first portion including a first set of information comprising a first row header, a first column header, and a first cell;
   creating a first table content document (TCD) based on the first set of information, a caption associated with the set of tabular data, and a file name associated with the set of tabular data;
   generating a query based on a question, wherein the query comprises a set of query features;
   determining that the first TCD comprises a first set of TCD features matching the set of query features above a first threshold;
   determining a first candidate answer based on the first TCD, wherein the first candidate answer comprises a subset of the first set of information associated with the first portion, and wherein the first candidate answer is associated with a first confidence rating based on the first set of TCD features matching the set of query features; and
   outputting the first candidate answer in response to the question.

2. The method of claim 1, wherein creating the first TCD further comprises:
   determining a first header keyword for the first column header and a second header keyword for the first row header;
   determining a first value keyword for the first cell;
   determining a first context keyword for the first set of tabular data;
   determining a first set of structural relationships, wherein the first set of structural relationships comprises combinations of the first row header, the first column header, and the first cell; and
   identifying metadata associated with the first set of tabular data, wherein the metadata comprises a table title, the file name, a document title, a section title, a table identifier (ID), and a sequence number.

3. The method of claim 1, further comprising:
   compiling multiple TCDs including the first TCD in a TCD index.

4. The method of claim 1, wherein the set of query features further comprises a respective weighting of at least feature context keyword, wherein the respective weighting is based on a number of appearances of the at least one context keyword in the caption associated with the set of tabular data.

5. The method of claim 1, wherein the set of query features are selected from a group consisting of: part of speech (POS) tags, n-grams, phrases, and sequences.

6. The method of claim 1, wherein outputting the first candidate answer in response to the question further comprises:
   scoring a plurality of candidate answers including the first candidate answer; and
   ranking the plurality of candidate answers according to the scoring of each candidate answer.

7. The method of claim 6, wherein scoring the plurality of candidate answers further comprises:
   classifying the query as a tabular type query;
   identifying a first set of shared features between the first candidate answer and the tabular type query, the first set of shared features above a second threshold; and
   determining a first score based on the set of shared features.

8. A system comprising:
   a processor; and
   a computer-readable storage medium storing program instructions, which, when executed by the processor, are configured to cause the processor to perform a method comprising:
   detecting a set of tabular data having a first portion including a first set of information comprising a first row header, a first column header, and a first cell;
   creating a first table content document (TCD) based on the first set of information, a caption associated with the set of tabular data, and a file name associated with the set of tabular data;
   generating a query based on a question, wherein the query comprises a set of query features;
   determining that the first TCD comprises a first set of TCD features matching the set of query features above a first threshold;
   determining a first candidate answer based on the first TCD, wherein the first candidate answer comprises a subset of the first set of information associated with the first portion, and wherein the first candidate answer is associated with a first confidence rating based on the first set of TCD features matching the set of query features; and
   outputting the first candidate answer in response to the question.

9. The system of claim 8, wherein creating the first TCD further comprises:
   determining a first header keyword for the first column header and a second header keyword for the first row header;
   determining a first value keyword for the first cell;
   determining a first context keyword for the first set of tabular data;
   determining a first set of structural relationships, wherein the first set of structural relationships comprises combinations of the first row header, the first column header, and the first cell; and
   identifying metadata associated with the first set of tabular data, wherein the metadata comprises a table title, the file name, a document title, a section title, a table identifier (ID), and a sequence number.

10. The system of claim 8, further comprising:
    compiling multiple TCDs including the first TCD in a TCD index.

11. The system of claim 8, wherein the set of query features further comprises a respective weighting of at least one context keyword, wherein the respective weighting is based on a number of appearances of the at least one context keyword in the caption associated with the set of tabular data.

12. The system of claim 8, wherein the set of query features are selected from a group consisting of: part of speech (POS) tags, n-grams, phrases, and sequences.

13. The system of claim 8, wherein outputting the first candidate answer in response to the question further comprises:
    scoring a plurality of candidate answers including the first candidate answer; and
    ranking the plurality of candidate answers according to the scoring of each candidate answer.

14. The system of claim 13, wherein scoring the plurality of candidate answers further comprises:

classifying the query as a tabular type query;
identifying a first set of shared features between the first candidate answer and the tabular type query, the first set of shared features above a second threshold; and
determining a first score based on the set of shared features.

15. A computer program product comprising a computer readable storage medium having program instructions embodied therewith, wherein the computer readable storage medium does not comprise a transitory signal per se, the program instructions executable by a processor to cause the processor to perform a method comprising:
detecting a set of tabular data having a first portion including a first set of information comprising a first row header, a first column header, and a first cell;
creating a first table content document (TCD) based on the first set of information, a caption associated with the set of tabular data, and a file name associated with the set of tabular data;
generating a query based on a question, wherein the query comprises a set of query features;
determining that the first TCD comprises a first set of TCD features matching the set of query features above a first threshold;
determining a first candidate answer based on the first TCD, wherein the first candidate answer comprises a subset of the first set of information associated with the first portion, and wherein the first candidate answer is associated with a first confidence rating based on the first set of TCD features matching the set of query features; and
outputting the first candidate answer in response to the question.

16. The computer program product of claim 15, wherein creating the first TCD further comprises:
determining a first header keyword for the first column header and a second header keyword for the first row header;
determining a first value keyword for the first cell;
determining a first context keyword for the first set of tabular data;
determining a first set of structural relationships, wherein the first set of structural relationships comprises combinations of the first row header, the first column header, and the first cell; and
identifying metadata associated with the first set of tabular data, wherein the metadata comprises a table title, the file name, a document title, a section title, a table identifier (ID), and a sequence number.

17. The computer program product of claim 15, further comprising:
compiling multiple TCDs including the first TCD in a TCD index.

18. The computer program product of claim 15, wherein the set of query features further comprises a respective weighting of at least one context keyword, wherein the respective weighting is based on a number of appearances of the at least one context keyword in the caption associated with the set of tabular data.

19. The computer program product of claim 15, wherein the set of query features are selected from a group consisting of: part of speech (POS) tags, n-grams, phrases, and sequences.

20. The computer program product of claim 15, wherein outputting the first candidate answer in response to the question further comprises:
scoring a plurality of candidate answers including the first candidate answer by:
classifying the query as a tabular type query;
identifying a first set of shared features between the first candidate answer and the tabular type query, the first set of shared features above a second threshold;
determining a first score based on the set of shared features; and
ranking the plurality of candidate answers according to the scoring of each candidate answer.

* * * * *